United States Patent
Assarpour

(10) Patent No.: US 9,083,563 B2
(45) Date of Patent: Jul. 14, 2015

(54) METHOD FOR REDUCING PROCESSING LATENCY IN A MULTI-THREAD PACKET PROCESSOR WITH AT LEAST ONE RE-ORDER QUEUE

(75) Inventor: Hamid Assarpour, Arlington, MA (US)

(73) Assignee: AVAYA, INC., Basking Ridge, NJ (US)

( * ) Notice: Subject to any disclaimer, the term of this patent is extended or adjusted under 35 U.S.C. 154(b) by 428 days.

(21) Appl. No.: 13/539,207

(22) Filed: Jun. 29, 2012

(65) Prior Publication Data

US 2014/0003439 A1   Jan. 2, 2014

(51) Int. Cl.
 *H04L 12/28* (2006.01)
 *H04L 12/64* (2006.01)
 *G06F 13/38* (2006.01)

(52) U.S. Cl.
 CPC .......... *H04L 12/6418* (2013.01); *G06F 13/385* (2013.01); *G06F 2213/3808* (2013.01)

(58) Field of Classification Search
 CPC .............. H04L 12/6418; G06F 13/385; G06F 2213/3808
 USPC ...................... 370/230, 230.1, 231, 235, 394, 370/412–417, 440
 See application file for complete search history.

(56) References Cited

U.S. PATENT DOCUMENTS

| | | | |
|---|---|---|---|
| 5,521,916 A * | 5/1996 | Choudhury et al. | 370/414 |
| 5,999,534 A * | 12/1999 | Kim | 370/395.42 |
| 6,147,996 A | 11/2000 | Laor et al. | |
| 6,798,743 B1 | 9/2004 | Ma et al. | |
| 2004/0076161 A1 * | 4/2004 | Lavian et al. | 370/395.41 |
| 2004/0205336 A1 * | 10/2004 | Kessler et al. | 713/160 |
| 2006/0085604 A1 * | 4/2006 | Guthrie et al. | 711/141 |

OTHER PUBLICATIONS

Combined Search and Examination Report from corresponding UK Patent Application No. GB1311082.0.

* cited by examiner

*Primary Examiner* — Mark Rinehart
*Assistant Examiner* — Mang Yeung
(74) *Attorney, Agent, or Firm* — Anderson Gorecki & Rouille LLP

(57) ABSTRACT

Packet processing is broken into two or more stages. In particular, the network processing unit 26 performs a first stage of packet processing related to packet forwarding and packet modification, and then performs a second stage of packet processing unrelated to packet forwarding and packet modification. Example processes unrelated to packet forwarding and packet modification may include state updates on the network element, such as statistics counter updates, stateful flow tracking, IPFix processing, MAC learning, and other processes important to operation of the network element, but which do not affect the appearance of the packet (e.g. packet format) and which do not affect the forwarding decision of the packet. Once the first stage of packet processing related to packet forwarding and packet modification has been completed, the flag associated with the packet is cleared in the scoreboard, to allow the packet to be transmitted from the reorder queue.

17 Claims, 6 Drawing Sheets

METHOD FOR REDUCING PROCESSING LATENCY IN A MULTI-THREAD PACKET PROCESSOR WITH AT LEAST ONE RE-ORDER QUEUE

CROSS-REFERENCE TO RELATED APPLICATIONS

None.

BACKGROUND

1. Field

This application relates to communication networks and, more particularly, to a method for reducing processing latency in a multi-thread packet processor with at least one re-order queue.

2. Description of the Related Art

Data communication networks may include various switches, nodes, routers, and other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

When a packet is received by a network element, the network element will process the packet and forward the packet on to its destination. To accelerate packet processing, a multi-thread packet processor may be used in which an execution pipeline is used to processes packets and each packet is assigned to a thread. Each thread processes a packet and has its own dedicated context, such as a program counter, link registers, address registers, data registers, local memories, etc. To increase performance, two or more execution pipelines may be used to process packets in parallel.

To prevent packets from arriving at their destination out of order, it is common for packets to be transmitted by a network element in the same order in which they are received. When a packet arrives, it is assigned to the next available thread and processed. Packets may be processed out of order, but before transmission the packets are re-ordered to restore the original order prior to transmission.

Typically, re-ordering is done using a single re-order queue. The re-order queue behaves as a First-In-First-Out (FIFO) memory. When a packet arrives, it is tagged with a unique service number, placed in the FIFO queue, and its tag is used as an index to set a busy flag in a scoreboard table. When the thread finishes processing the packet, it uses the tag to clear the busy flag in the scoreboard table. After releasing the busy flag, the thread is placed into the free thread pool to be picked up by the next packet. The re-order queue reader agent is an independent entity that constantly uses the tag from the packet at the head of the FIFO to check the scoreboard table to determine if the corresponding busy flag is cleared. Once the busy flag for the packet at the head of the FIFO has been released, the packet at the head of the FIFO queue is transmitted out and the queue read pointer is advanced to point to the next packet in the queue.

There are instances where one packet has completed processing, and is ready to be transmitted, but other packets ahead of it in the reorder queue are not yet ready to be transmitted. For example, different types of packets may have different processing requirements. However, because the packets must be transmitted in the same order in which they were received, this will cause transmission of the packet to be delayed even though the network element has finished processing that packet. Specifically, if other packets ahead of it in the queue have not completed processing, the packet that has completed processing must wait until all the other packets ahead of it in the queue finish processing before it can be transmitted. Accordingly, it would be advantageous to provide a way to accelerate transmission of packets without compromising the in-order transmission of packets from a network element.

SUMMARY OF THE DISCLOSURE

The following Summary, and the Abstract set forth at the end of this application, are provided herein to introduce some concepts discussed in the Detailed Description below. The Summary and Abstract sections are not comprehensive and are not intended to delineate the scope of protectable subject matter which is set forth by the claims presented below.

Packet processing is broken into two or more stages. In particular, the network processing unit 26 performs a first stage of packet processing related to packet forwarding and packet modification, and then performs a second stage of packet processing unrelated to packet forwarding and packet modification. Example processes unrelated to packet forwarding and packet modification may include state updates on the network element, such as statistics counter updates, stateful flow tracking, IPFix processing, MAC learning, and other processes important to operation of the network element, but which do not affect the appearance of the packet (e.g. packet format) and which do not affect the forwarding decision of the packet. Once the first stage of packet processing related to packet forwarding and packet modification has been completed, the flag associated with the packet is cleared in the scoreboard, to allow the packet to be transmitted from the reorder queue.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
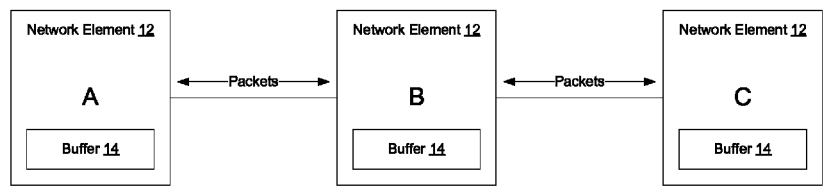
FIG. 1 is a functional block diagram of an example network.

FIG. 1 illustrates an example of a network 10 in which a plurality of switches 12 are interconnected to transmit packets of data. As packets are received, they are placed in buffers 14 to be stored while they are processed, and then forwarded toward their destination on the network.

Figure 2:
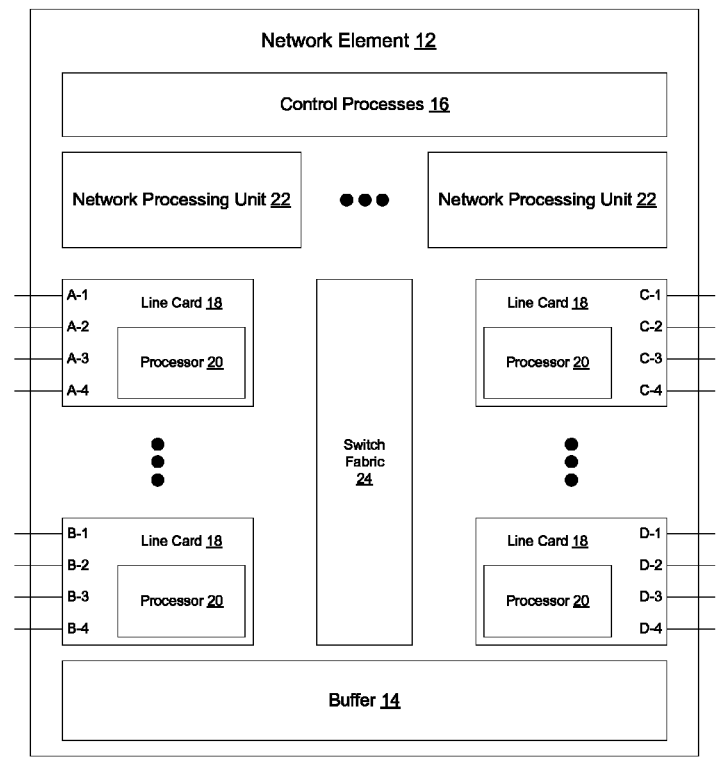
FIG. 2 is a functional block diagram of an example network element.

FIG. 2 shows an example network element 12 which may be used to implement an embodiment. The processes described herein for handling packets may be implemented in multiple types of network elements and the process described herein is not limited to the example shown in FIG. 2. Rather, FIG. 2 is merely intended to provide one example of how a network element may be configured to implement the functions described in greater detail below. The network element of FIG. 2 may be used as an edge network element such as an edge router, a core network element such as a router/switch, or as another type of network element. The network element of FIG. 2 may be implemented on a communication network utilizing one of the Ethernet 802.1 standards, such as 802.1ad, 803.2ah, 802.1Qay, 802.1aq, or other routed Ethernet standard. The network element of FIG. 2 may also be used in other types of wired/wireless communication networks.

As shown in FIG. 2, the network element 12 includes one or more control processes 16 to control operation of the network element. Example control processes may include routing processes, network operation administration and management software, an interface creation/management process, and other processes. The particular manner in which the network element is being controlled is not particularly important to understanding operation of the network element on the network and, accordingly, has not been treated in excessive detail herein.

The network element also includes a dataplane configured to handle the rapid transmission of packets of data. The data plane, in the illustrated embodiment, includes ports connected to physical media to receive and transmit data. The physical media may include fiber optic cables or electrical wires. Alternatively, the physical media may be implemented as a wireless communication channel, for example using one of the cellular, 802.11 or 802.16 wireless communication standards. In the illustrated example, ports are supported on line cards 18 to facilitate easy port replacement, although other ways of implementing the ports may be used as well.

The line cards 18 have processing capabilities such as a microprocessor 20 or other hardware configured to format the packets, perform pre-classification of the packets, etc. The data plane further includes one or more Network Processing Unit (NPU) 22 and a switch fabric 24. The NPU and switch fabric enable data to be switched between ports to allow the network element to forward network traffic toward its destination on the network.

In one embodiment, each network processing unit 22 implements one or more physical execution pipelines, each of which are shared among multiple threads. Each thread has its own dedicated context such as program counter, link registers, address registers, data registers, local memory, etc., and is used to manage processing of a single packet. Multi-threaded packet processors are well known in the art and, accordingly, well known implementation details have not been included herein to avoid obfuscation of the salient portions of the disclosure.

According to an embodiment, packet processing is broken into two or more stages. In particular, the network processing unit 22 performs a first stage of packet processing related to packet forwarding and packet modification, and then performs a second stage of packet processing unrelated to packet forwarding and packet modification. Example processes unrelated to packet forwarding and packet modification may include state updates on the network element, such as statistics counter updates, stateful flow tracking, IPFix processing, MAC learning, and other processes important to operation of the network element, but which do not affect the appearance of the packet (e.g. packet format) and which do not affect the forwarding decision of the packet. As described in greater detail below, once the first stage of packet processing related to packet forwarding and packet modification has been completed, the flag associated with the packet is cleared in the scoreboard, to allow the packet to be transmitted from the reorder queue.

Figure 6:
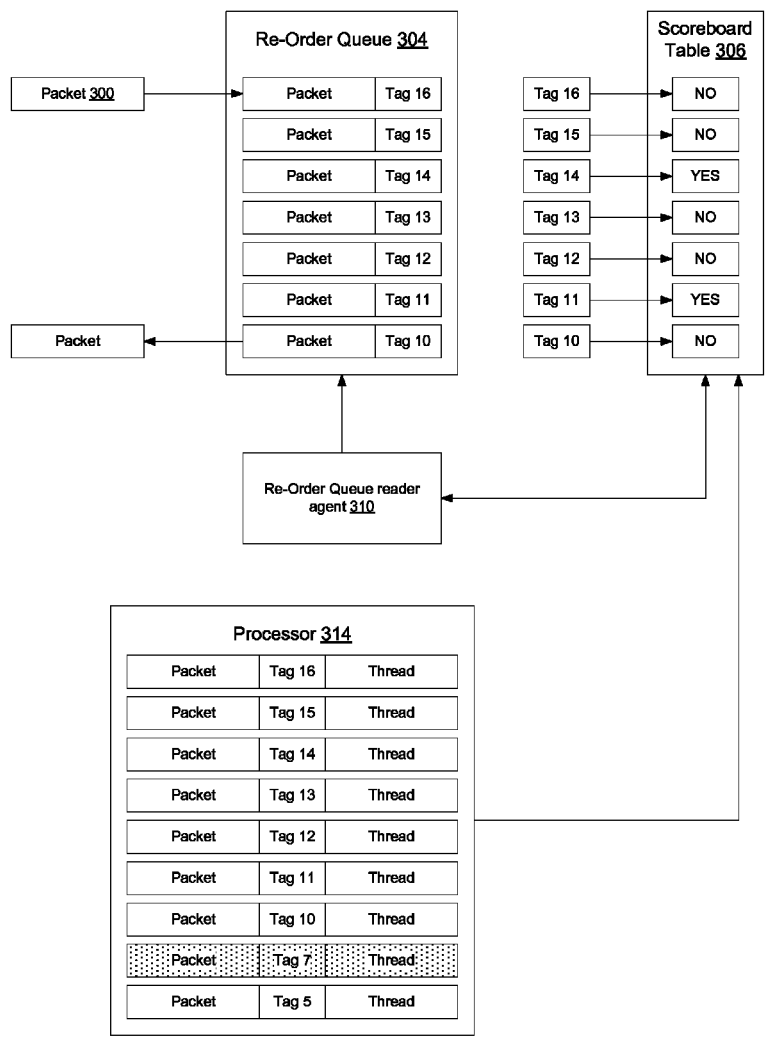
Figure 7:
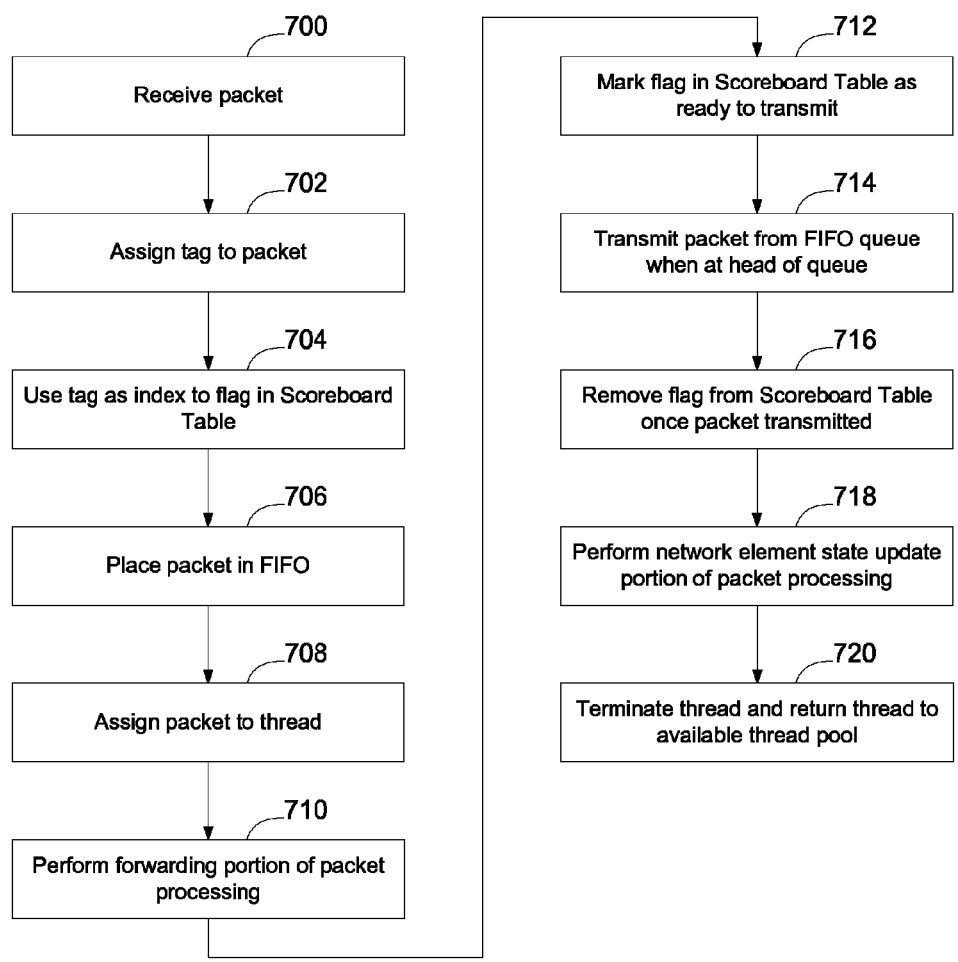
FIG. 7 is a flow diagram of a process for reducing processing latency in a multi-thread packet processor with at least one re-order queue.

FIG. 7 is a functional block diagram illustrating an example process for reducing processing latency in a multi-thread packet processor with at least one re-order queue. This process is graphically illustrated in the functional block diagrams of FIGS. 3-6.

When a packet is received (700), a tag is assigned to the packet (702) which will be used to identify the packet within the network element as the packet is processed by the network processing unit and other processors implementing the network element hardware. The term "tag" as that term is used in this context, is herein defined as an identifier used by the hardware to identify a packet within the network element. In this context, the term "tag" has no association with other tags that are commonly applied to packets in packet headers.

Figure 3:
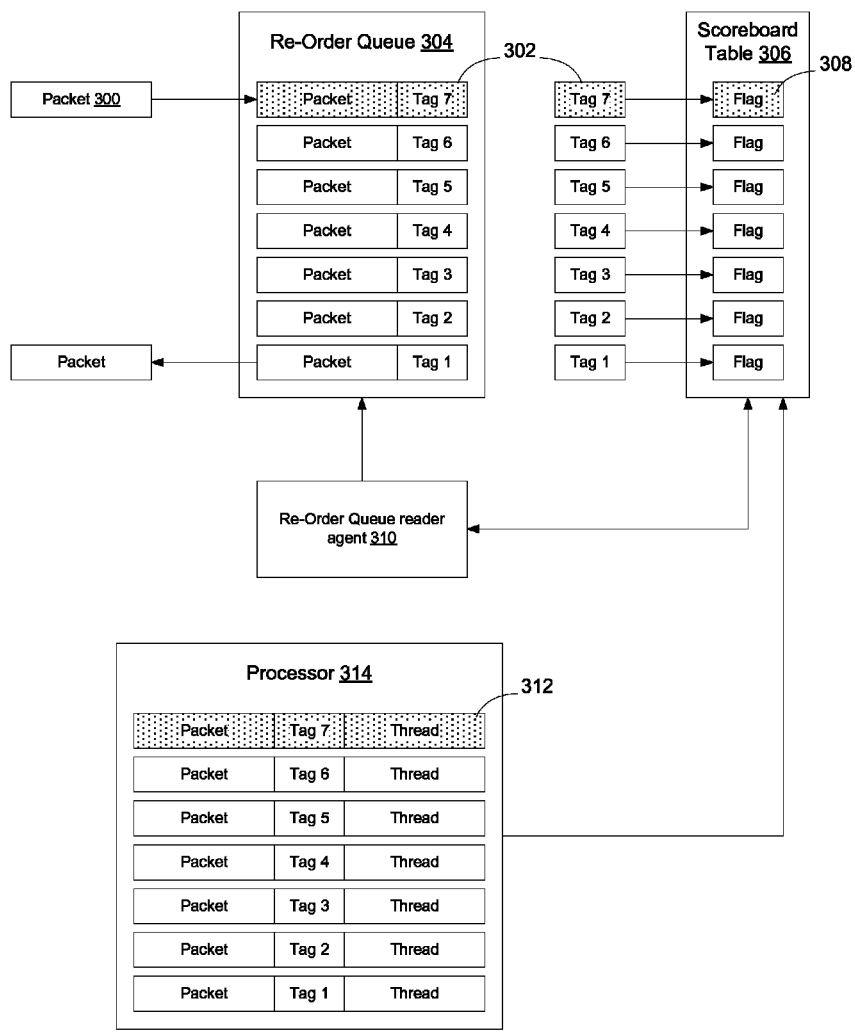
FIGS. 3-6 are functional block diagrams showing example states a network element may encounter when processing a packet according to an embodiment.

FIG. 3 shows an example group of hardware elements that may be used, in one embodiment, to process packets. As shown in FIG. 3, when a packet 300 is received (700), a tag 302 is assigned to the packet (700), and the packet is placed in a re-order queue 304 (706). The tag 302 attached to the packet in the re-order queue will be used to identify the packet as it is being manipulated by other components of the network element. Additionally, the tag acts as an index to a scoreboard table 306 (704) which contains flags 308 identifying which packets are ready for transmission from the re-order queue and which are not ready for transmission from the re-order queue.

Packets are transmitted from the re-order queue in the order in which they are received. Specifically, the re-order queue operates as a First In First Out (FIFO) queue. In the illustrated example, the packet associated with Tag 1 is at the head of the queue and will be the next packet transmitted from the re-order queue. A re-order queue reader agent 310 reads the tag of the packet at the head of the queue and polls the scoreboard table 306 to determine when the flag associated with the packet is cleared in the scoreboard table. For example, in FIG. 3, re-order queue reader agent 310 will read the value of tag 1 and use that value as an index into the scoreboard table to read the flag at the position in memory identified by the value of tag 1. When for the packet that is at the head of the re-order queue is cleared, the re-order queue reader agent will provide a signal to the re-order queue or otherwise cause the re-order queue to transmit the packet that is currently stored at the head of the queue. The tag may be removed from the packet in connection with transmission of the packet from the re-order queue or, if the tag has other use in connection with packet tracking within the network element, it may continue to be associated with the packet until no longer needed. Since the tag has only local significance, the tag will be removed from the packet prior to transmission of the packet on the network.

In addition to being placed in the re-order queue, the packet is assigned to a thread 312 in processor 314 (708). The processor is pipelined such that one stage of packet processing occurs at each stage of the pipelined process. In the example illustrated in FIG. 3, the processor has separate threads for each of packets 1 through 7.

In one embodiment, the pipeline is designed such that operations associated with packet formatting and packet forwarding decisions are implemented toward the beginning of the pipeline and other non-format related and non-forwarding related operations are implemented toward the end of the pipeline. By implementing the forwarding decision operations and packet format related operations toward the beginning of the pipeline, it becomes possible to complete stage one processing earlier in the pipeline and to mark the packets for transmission before completion of all processing associated with the packet (i.e. before termination of the thread associated with the packet).

Figure 4:
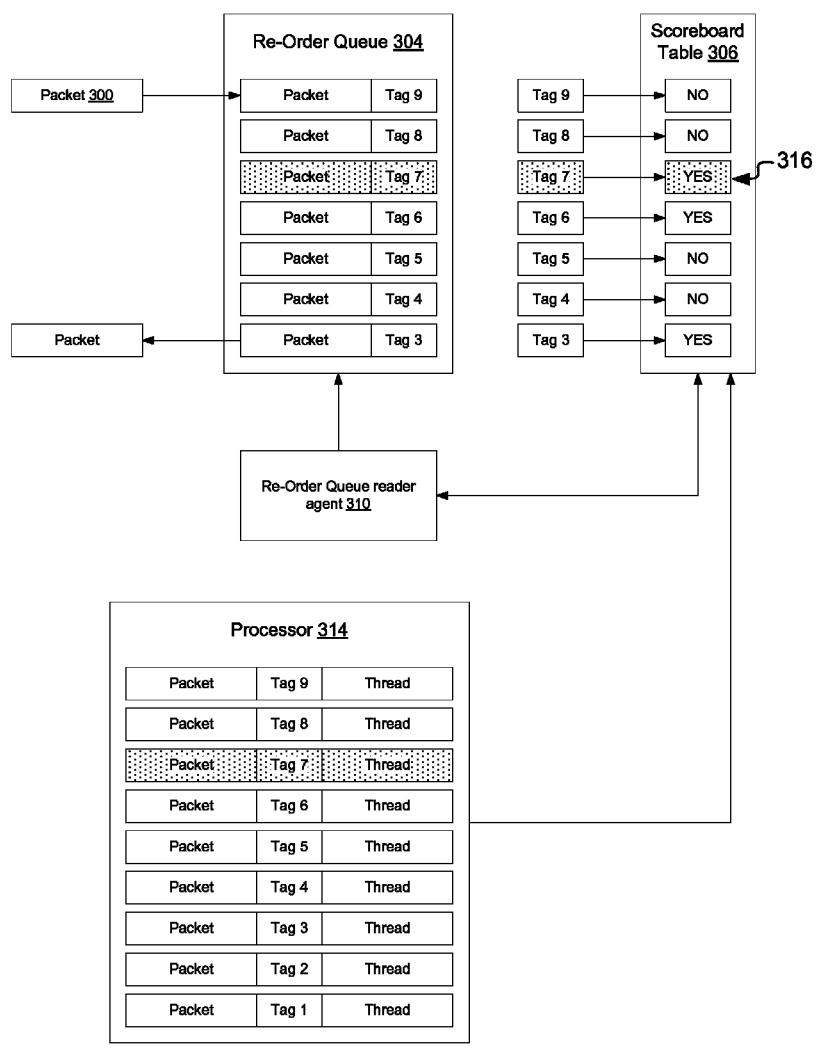

FIG. 4 shows the example system of FIG. 3 a portion of the packet processing operations specified in the pipeline have been completed. Specifically, as shown in FIG. 4, the packet associated with tag 7 is no longer at the tail of the queue, since two additional packets have arrived. In addition, the processor has executed stage 1 processing on the packet associated with tag 7, such that all stages of the pipeline associated with packet forwarding operations and packet formatting operations have been completed (710). Accordingly, the processor 314 will use the value of the tag as an index into the scoreboard table to cause the flag at the memory location identified by tag 7 to be cleared 316 (712). The packet associated with tag 7 will not be transmitted, at this stage however, since other packets ahead of it in the re-order queue have not yet completed stage 1 processing. In particular, the packet associated with tag 4 and the packet associated with tag 5 have not completed stage 1 processing and, accordingly, the associated flags for those packets have not been cleared in the scoreboard table. The flag for packet 3 has been cleared and packet 3 is at the head of the re-order queue and, accordingly the packet associated with tag 3 will be transmitted from the re-order queue.

Figure 5:
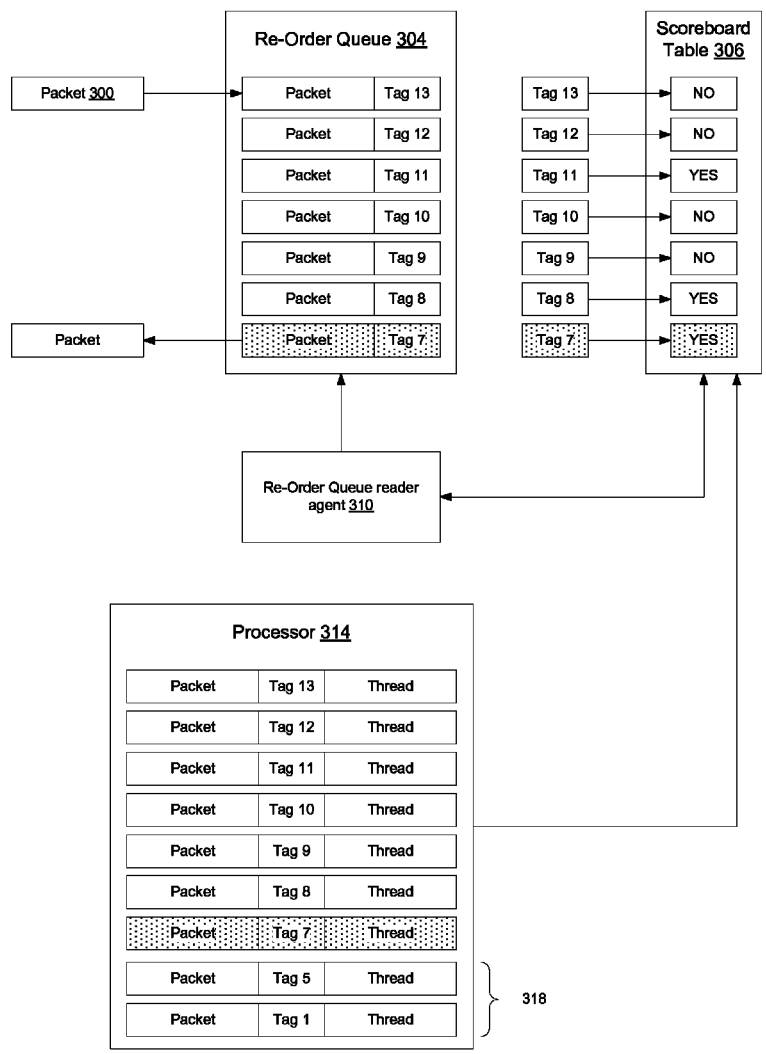

FIG. 5 shows the state of the system when packet 7 reaches the head of the re-order queue. Specifically, as shown in FIG. 5, the packet associated with tag 7 has reached the head of the re-order queue (714). When this occurs, re-order queue reader agent will read the tag associated with the packet and, using that value, will index into the scoreboard table to read the flag associated with that packet. Since this flag has previously been cleared, the packet associated with tag 7 will be transmitted from the re-order queue. If the flag had not previously been cleared, the packet associated with tag 7 would be held in the re-order queue until stage 1 processing of the packet has been completed. Once the packet has been forwarded from the queue, the memory location within the scoreboard table is cleared and allowed to be used by another packet (716).

As shown in FIG. 5, there are several threads 318 executing on processor 314 for which there is no corresponding packet in the re-order queue. In particular, packets 5 and 1 have both been transmitted from the re-order queue. Yet, the thread 318 associated with packet 5 and the thread 320 associated with packet 1 both are still executing on the processing pipeline implemented by processor 314. According to an embodiment, network element state update portions of packet processing and other operations not related to packet formatting or packet forwarding (718) are implemented after the packet has been marked to be forwarded from the re-order queue, so that packets in the re-order queue are not detained within the re-order queue while operations related to network element specific control processes and other processes are updated. The other threads associated with packets 2-4 and 6 have completed and, accordingly, those threads have been terminated and are able to be taken up by subsequent packets (720).

FIG. 6 shows the state of the system after the packet associated with tag 7 has been transmitted from the re-order queue. In particular, the thread associated with tag 7 continues to execute, even though the packet associated with tag 7 has been transmitted from the re-order queue and may have also been transmitted on one or more output ports of the network element toward its destination on the network.

As described above, after a thread finishes stage 1 processing, it sends a special command to the scoreboard to clear the flag. This action will release the packet in the queue to be transmitted when it gets to the head of the queue. Meanwhile, the thread continues to hold onto the packet context and continues with stage 2 processing. Essentially, the thread execution state moves from the foreground to the background and it no longer blocks other packets that may have stuck behind it in the re-order queue. After the thread completes stage 2 processing, it kills itself. This action will place the thread back in the free pool where it will be picked up by the next packet.

The stage 2 processes that may be implemented include any processing steps that are not required to be implemented prior to transmission of the packet. Example stage 2 processes may include maintenance processing, table management processing, control protocol state updates, packet statistics, etc. Once only stage 2 processes remain to be implemented, the thread may release the packet immediately from the re-order queue and continue processing the packet in the background.

Processing of packets in this manner may operate in an environment where one re-order queue is used or in an environment where multiple re-order queues are in use. Where different re-order queues are used, e.g. separate queues are used for separate packet flows, individual packets may cause blocking within a particular re-order queue. Accordingly, processing packets using the two stage process described above will accelerate packet forwarding and reduce packet latency within a re-order queue regardless of the number of re-order queues used to designate packets for forwarding from the packet processor. In an embodiment where multiple re-order queues are used, a single scoreboard table per re-order queue may be implemented per re-order queue or, optionally, multiple re-order queues may use the same scoreboard table as long as the tags used to identify packets within the re-order queues are unique across the set of re-order queues that share the scoreboard table.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of reducing processing latency in a multi-thread packet processor with at least one first-in-first-out re-order queue, the method comprising the steps of:
    implementing stage 1 packet processing;
    marking a packet as ready to be transmitted from the first-in-first-out re-order queue in a scoreboard table;
    reading an identifier at the head of the re-order queue,
    using the identifier to locate a flag in the scoreboard table,
    reading the flag in the scoreboard table associated with the identifier, and
    transmitting the packet if the flag in the scoreboard table indicates that stage 1 processing has been completed for the packet; and
    implementing stage 2 packet processing after the step of marking the packet for transmission from the re-order queue.

2. The method of claim 1, wherein stage 1 packet processing and stage 2 packet processing collectively form a multi-stage packet processing pipeline, in which one stage of packet processing occurs at each stage of the pipelined process.

3. The method of claim 2, wherein the packet processor maintains a separate thread for each packet in the pipeline.

4. The method of claim 1, wherein the stage 1 packet processing contains processing stages associated with actions that must be implemented in connection with forwarding the packet.

5. The method of claim 4, wherein the stage 1 packet processing includes operations associated with packet formatting and making packet forwarding decisions.

6. The method of claim 1, wherein the stage 2 packet processing contains processing stages associated with actions that are not required to be implemented in connection with forwarding the packet.

7. The method of claim 6, wherein the stage 2 packet processing includes operations not associated with packet formatting and not associated with making packet forwarding decisions.

8. The method of claim 7, wherein the stage 2 packet processing includes operations that include network element state updates.

9. The method of claim 1, wherein the scoreboard table contains a set of flags, each flag representing a state of one of the threads of the multi-thread packet processor.

10. The method of claim 9, wherein the flags are used to mark the packets as ready to be transmitted from the re-order queue.

11. The method of claim 1, further comprising the steps of receiving a plurality of packets, assigning an identifier to each packet, and including the identifier in the re-order queue.

12. The method of claim 1, further comprising transmitting a packet identified via the identifier at the head of the re-order queue only if the packet at the head of the re-order queue is marked as ready to be transmitted.

13. The method of claim 1, wherein at least some of the processes associated with of implementing stage 2 packet processing occur after the step of transmitting the packet from the re-order queue.

14. A network element, comprising:
    a multi-threaded packet processor, each thread of the multi-threaded packet processor being assigned to a separate packet, the processor being configured to implemented a pipelined packet processing scheme in which one stage of packet processing occurs at each stage of the pipelined packet processing scheme;
    a scoreboard table containing flags associated with packets assigned to threads in the multi-threaded packet processor; and
    a re-order queue maintaining packet order;
    wherein the network element is configured to identify a packet at a head of the re-order queue, check one of the flags in the scoreboard table associated with the packet at the head of the re-order queue to determine if the packet is ready to be forwarded, and forward the packet only when the one of the flags in the scoreboard table associated with the packet at the head of the re-order queue indicates that the packet is ready to be forwarded; and
    wherein the multi-threaded packet processor will cause the one of the flags in the scoreboard table associated with the packet at the head of the re-order queue to indicate that the packet is ready to be forwarded prior to completion of all stages of packet processing of the pipelined packet processing scheme.

15. The method of claim 14, wherein a first set of stages of packet processing associated with packet formatting and making packet forwarding decisions is implemented before the one of the flags in the scoreboard table associated with the packet at the head of the re-order queue is caused to indicate that the packet is ready to be forwarded.

16. The method of claim 15, wherein a second set of stages of packet processing associated with actions that are not required to be implemented in connection with forwarding the packet are implemented after the one of the flags in the scoreboard table associated with the packet at the head of the re-order queue is caused to indicate that the packet is ready to be forwarded.

17. The method of claim 14, wherein the multi-threaded packet processor will complete at least some of the stages of packet processing associated with the packet at the head of the re-order queue after forwarding the packet at the head of the re-order queue.

\* \* \* \* \*